US012157267B2

(12) United States Patent
Jeng et al.

(10) Patent No.: US 12,157,267 B2
(45) Date of Patent: Dec. 3, 2024

(54) DEPOSITION ADDITIVE MANUFACTURING EQUIPMENT

(71) Applicant: National Taiwan University of Science and Technology, Taipei (TW)

(72) Inventors: Jeng-Ywan Jeng, Taipei (TW); Ding-Zheng Lin, Taipei (TW); Ping-Hung Yu, Taipei (TW); Yu-Cheng Chen, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 72 days.

(21) Appl. No.: 17/827,786

(22) Filed: May 29, 2022

(65) Prior Publication Data
US 2023/0141628 A1    May 11, 2023

(30) Foreign Application Priority Data
Nov. 10, 2021  (TW) ................................. 110141743

(51) Int. Cl.
*B29C 64/286*  (2017.01)
*B29C 64/129*  (2017.01)
*B29C 64/245*  (2017.01)
*B29C 64/255*  (2017.01)
*B29C 64/393*  (2017.01)
(Continued)

(52) U.S. Cl.
CPC .......... *B29C 64/129* (2017.08); *B29C 64/245* (2017.08); *B29C 64/255* (2017.08); *B29C 64/393* (2017.08); *B33Y 30/00* (2014.12); *B33Y 50/02* (2014.12)

(58) Field of Classification Search
CPC ..... B29C 64/124; B29C 64/29; B29C 64/264; B29C 64/268; B29C 64/273; B29C 64/277; B29C 64/282; B29C 64/286; B29C 64/291; B29C 64/245; B29C 64/255; B29C 64/393; B33Y 30/00; B33Y 50/02; B33Y 10/00
See application file for complete search history.

(56) References Cited

U.S. PATENT DOCUMENTS

2019/0084243 A1*  3/2019  Wilenski ................ B33Y 10/00
2020/0001525 A1*  1/2020  Wynne ................... B29C 64/20
(Continued)

FOREIGN PATENT DOCUMENTS

KR       20190059099 A  *  5/2019  ........... B29C 64/245

*Primary Examiner* — Jamel M Nelson

(57) ABSTRACT

A large area deposition type additive manufacturing equipment is disclosed. The large area deposition type additive manufacturing equipment includes a light source module, a dynamic photomask module, a raw material tank and a deposition module. The light source module includes a plurality of light emitting members, a light diffusion member, a light enhancement member and a light emitting angle limiter. Light emitted from the light emitting members passes through the light diffusion member, the light enhancement member and the light emitting angle limiter to become a collimated curing light. The collimated curing light travels through a transparent member of the raw material tank and a dynamic photomask module to reach liquid photocurable material in the raw material tank, thereby curing the liquid photocurable material. The angle of emitted light ranges within ±30° with respect to a normal line of an incident plane of the light source module.

10 Claims, 6 Drawing Sheets

(51) Int. Cl.
  *B33Y 30/00* (2015.01)
  *B33Y 50/02* (2015.01)

(56) References Cited

U.S. PATENT DOCUMENTS

2020/0353684 A1* 11/2020 Dudley ................ B29C 64/124
2021/0146620 A1* 5/2021 Rakkolainen .......... B33Y 10/00

* cited by examiner

DEPOSITION ADDITIVE MANUFACTURING EQUIPMENT

CROSS REFERENCE TO RELATED APPLICATIONS

The present application claims the benefit of Taiwanese Patent Application No. 110141743 filed on Nov. 10, 2021, the contents of which are incorporated herein by reference in their entirety.

BACKGROUND OF THE INVENTION

Field of the Invention

The invention relates to a technical field of additive manufacture, and more particularly to an additive manufacturing equipment configured to deposit raw material in a large area and reduce drag force between the product and the raw material tank.

Description of the Related Art

Additive manufacturing process, also named as three-dimensional printing, can be applied to various objects having a complicated shape and not easily manufactured by traditional processing technique. The additive manufacturing technology has many kinds of process, such as the fused deposition modeling, the photopolymerization, the powder bed fusion, the binder jetting, the material jetting, the laminated object manufacturing, and the direct energy deposition, wherein the photopolymerization has become an important process. Different from the additive manufacturing process using metal material, the photopolymerization has applications for the market of the products more used in our daily life, which includes the fields in health caring, automobile industry, aerospace & national defense field, architecture and education. The photopolymerization plays an important role in the development of the additive manufacturing technology.

The photopolymerization process can be performed by a top-down type system or a bottom-up type system. The top-down type system has a light source located above a raw material tank (vat), and light from the light source travels downwards into the raw material for curing one layer of liquid photocurable material on a carrying platform, and the carrying platform moves downwards for curing the next layer of the liquid photocurable material. The bottom-up type system has the light source located under the raw material tank, and light from the light source travels upwards to pass through and enter a bottom of the raw material tank. The liquid photocurable material in the raw material tank is cured for one layer on the carrying platform by the light, and afterwards the carrying platform moves upwards, thereby curing the next layer of the liquid photocurable material thereon.

As for the conventional bottom-up type system of photopolymerization process, because the deposition region is close to the bottom of the raw material tank, the cured material is adhered to the bottom of the tank. The cured material must be separated from the bottom of the tank and liquid photocurable material flows to fill the region previously occupied by the cured material before the formation of the next layer of the photocurable material. For this purpose, the carrying platform have to move up and then down to a position spaced from the bottom of the raw material tank by a distance corresponding to one layer of the photocurable material to be cured. Therefore, such a conventional photopolymerization process using the bottom-up type system has a low production rate and small production capability.

Moreover, as the conventional photopolymerization process uses UV light sources, such as light emitting diode of UV light, the cost of the equipment is increased. The UV light sources may also reduce the service life of a liquid crystal panel serving as a photomask. Another conventional photopolymerization equipment uses a lens array for converging light from the light source. However, the lens array has a higher cost and occupies a considerable space. The most important problem of conventional photopolymerization equipment mentioned above is the non-uniform light intensity, which usually occurs at the boundary or interactions of the lens array.

BRIEF SUMMARY OF THE INVENTION

An object of the present invention is to provide a large area deposition type additive manufacturing equipment which solves the problems of low production rate and insufficient production capability, and also solves the problem of high cost, low service life and non-uniform light intensity for the light source.

The invention provides a large area deposition type additive manufacturing equipment. The large area deposition type additive manufacturing equipment in accordance with an exemplary embodiment of the invention includes a light source module, a dynamic photomask module, a raw material tank and a deposition module. The light source module includes a plurality of light emitting members arranged in an array; a light diffusion member including a plurality of first micro-structure configured to diffuse light; a light enhancement member including a plurality of second micro-structure configured to converge the light; and a light emitting angle limiter including a plurality of third micro-structure configured to limit a light emitting angle of the light. The dynamic photomask module is disposed above the light source module and generates a plurality of photomasks over time. The raw material tank includes a peripheral wall, a bottom wall and a transparent member, wherein the peripheral wall is connected to the bottom wall, and the transparent member is disposed on the bottom wall, and a liquid photocurable raw material is stored in the raw material tank. The deposition module includes a carrying platform and a driving device driving the carrying platform along a first direction to approach or move away from the bottom wall, wherein the carrying platform has a deposition surface facing the bottom wall. The light emitting members emit light to pass through the light diffusion member, the light enhancement member and the light emitting angle limiter to form a curing light having an collimated emitting angle, the curing light travels through the transparent member and reaches the liquid photocurable raw material, the liquid photocurable raw material is cured and deposited to the carrying platform layer by layer, and the light emitting angle ranges less than ±30° with respect to a normal line of an incident plane of the light emitting angle limiter.

In another exemplary embodiment, the first micro-structure is granular, the second micro-structure is prism-shaped, and the third micro-structure is louver-shaped.

In yet another exemplary embodiment, the peripheral wall is detachably connected to the bottom wall, the bottom wall has a first opening to which the transparent member is disposed, and the dynamic photomask module corresponds the first opening.

In another exemplary embodiment, the dynamic photomask module is surrounded by the peripheral wall and disposed near the first opening, and the curing light passes through the transparent member and the dynamic photomask module sequentially.

In yet another exemplary embodiment, the carrying platform has a plurality of through holes through which the liquid photocurable raw material flows.

In another exemplary embodiment, the deposition module further includes an ultrasonic oscillator disposed on a surface of the carrying platform opposite to the deposition surface.

In yet another exemplary embodiment, the deposition module further includes a weight sensor disposed at the connection of the driving device and the carrying platform, and the weight sensor is configured to detect a load of the carrying platform.

In another exemplary embodiment, the driving device includes a bracket, a rail and a driving member, the carrying platform is disposed on the bracket, the driving member drives the bracket to move on the rail along the first direction.

In yet another exemplary embodiment, the large area deposition type additive manufacturing equipment further includes a control module configured to control a speed of the carrying platform according to the detection of the weight sensor.

In another exemplary embodiment, the light emitted from the light emitting members is visible light, and the liquid photocurable raw material is cured by visible light.

The large area deposition type additive manufacturing equipment of the present invention is provided with the carrying platform of large area, the large bracket, the large rail and the driving member of large power, whereby the additive manufacturing equipment of bottom-up type is able to form a plurality of products on the carrying platform in one process. The ultrasonic oscillators vibrate the product, thereby separating the product from the bottom of the raw material tank. The weight sensor detects a load of the carrying platform to regulate the speed of the carrying platform so as to reduce the drag force generated between the product and the raw material tank, thereby preventing the product separated from the carrying platform. In the present invention, the carrying platform does not need to move up and down for separation of the product from the raw material tank before the formation of the next layer as what is performed in the conventional additive manufacturing equipment. Therefore, the production rate is increased to obtain a sufficient production ability.

Moreover, the large area deposition type additive manufacturing equipment of the present invention is also provided with light sources of visible light, and the liquid photocurable material is cured by the visible light. As the UV light is replaced by the visible light, the cost of the equipment is reduced, and the problem of reduction in service life of the equipment caused by UV light is also solved. In addition, as the light source module of the present invention includes the light diffusion member, the light enhancement member and the light emitting angle limiter, uniform light intensity and a small light emitting angle are obtained, thereby obtaining products of uniform quality.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
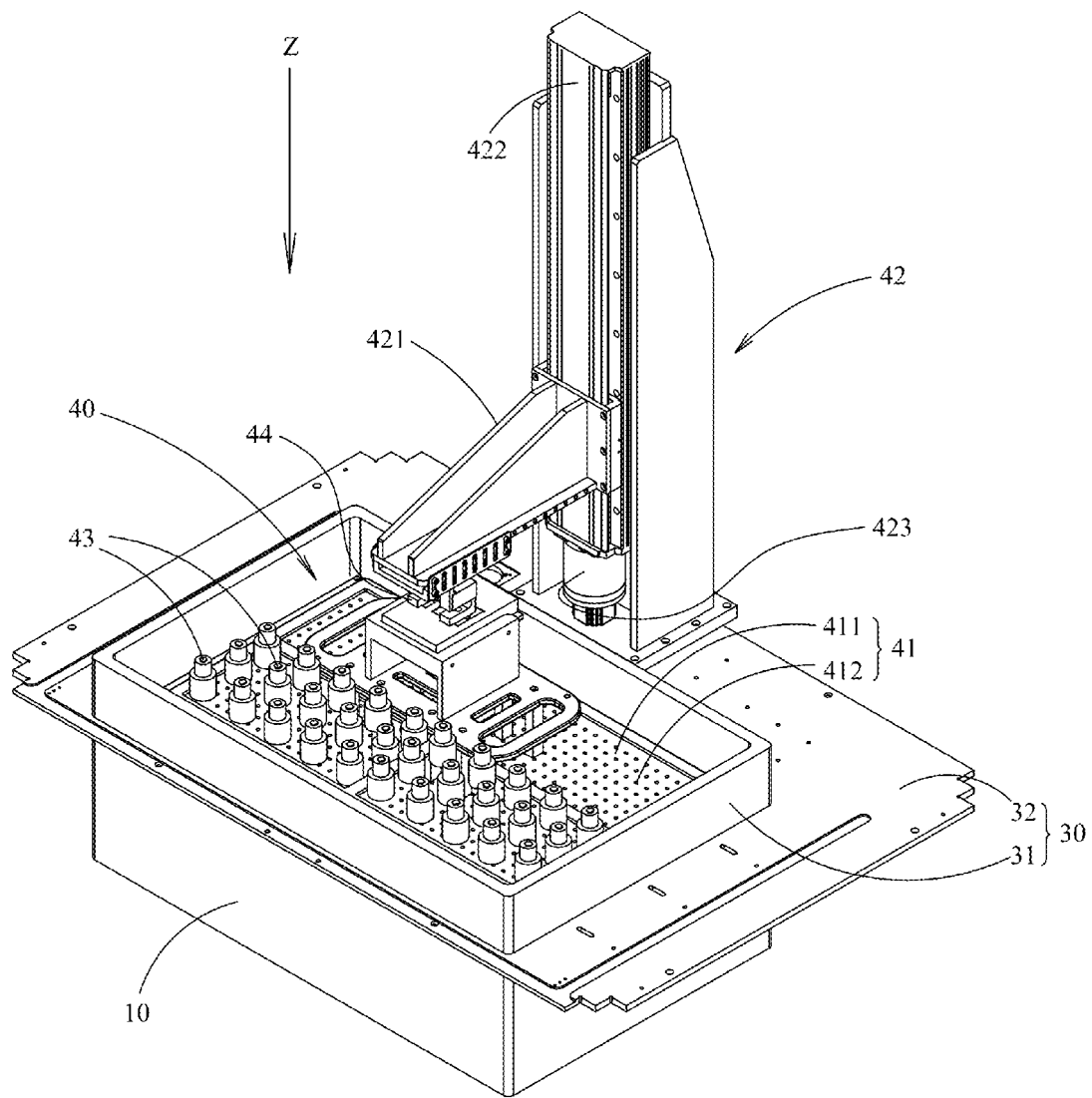
FIG. 1 is a perspective view of an embodiment of a large area deposition type additive manufacturing equipment of the present invention.
Figure 2:
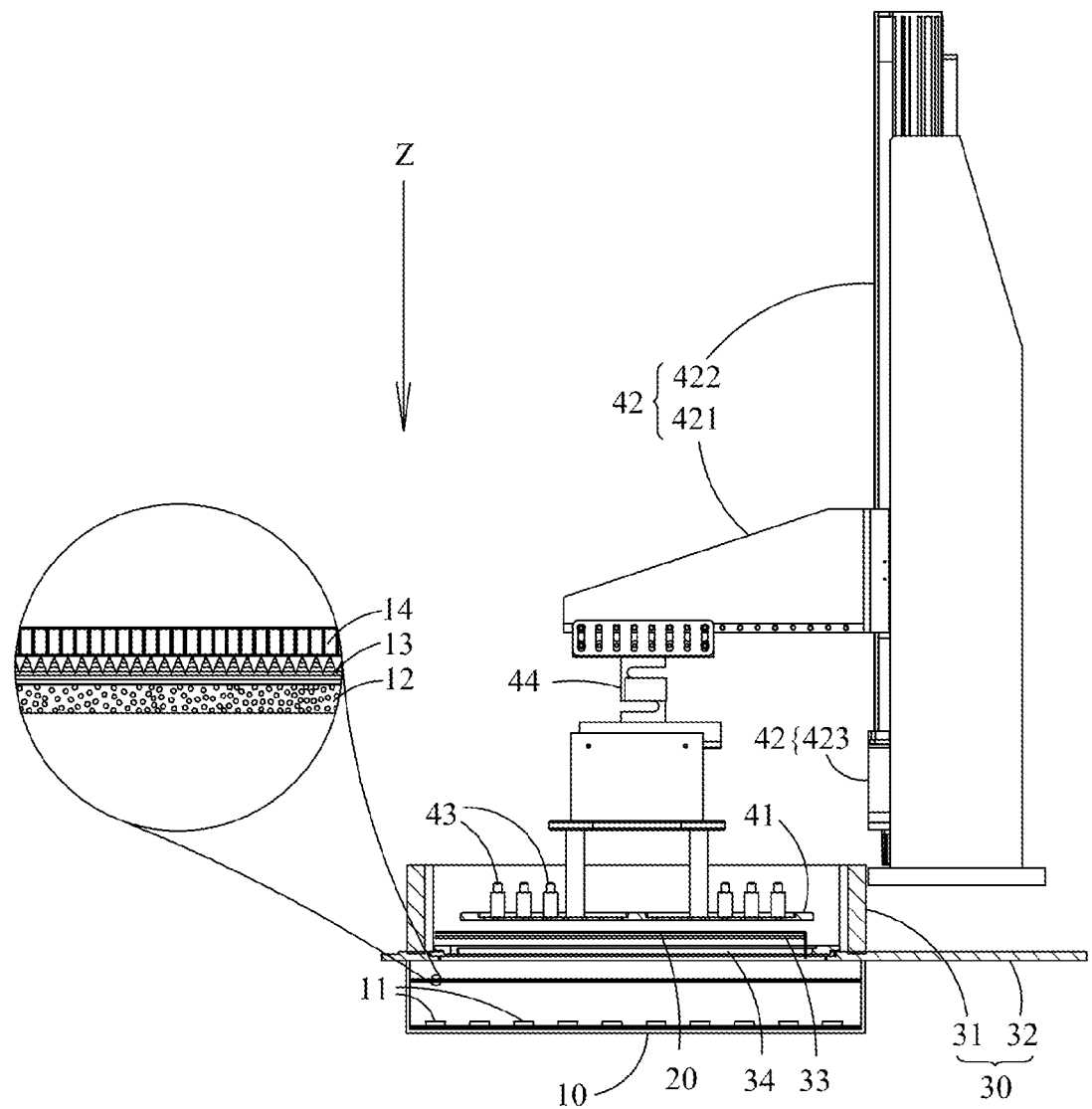
FIG. 2 is a side view of the large area deposition type additive manufacturing equipment of FIG. 1 and an enlarged view of a light source module.
Figure 3:
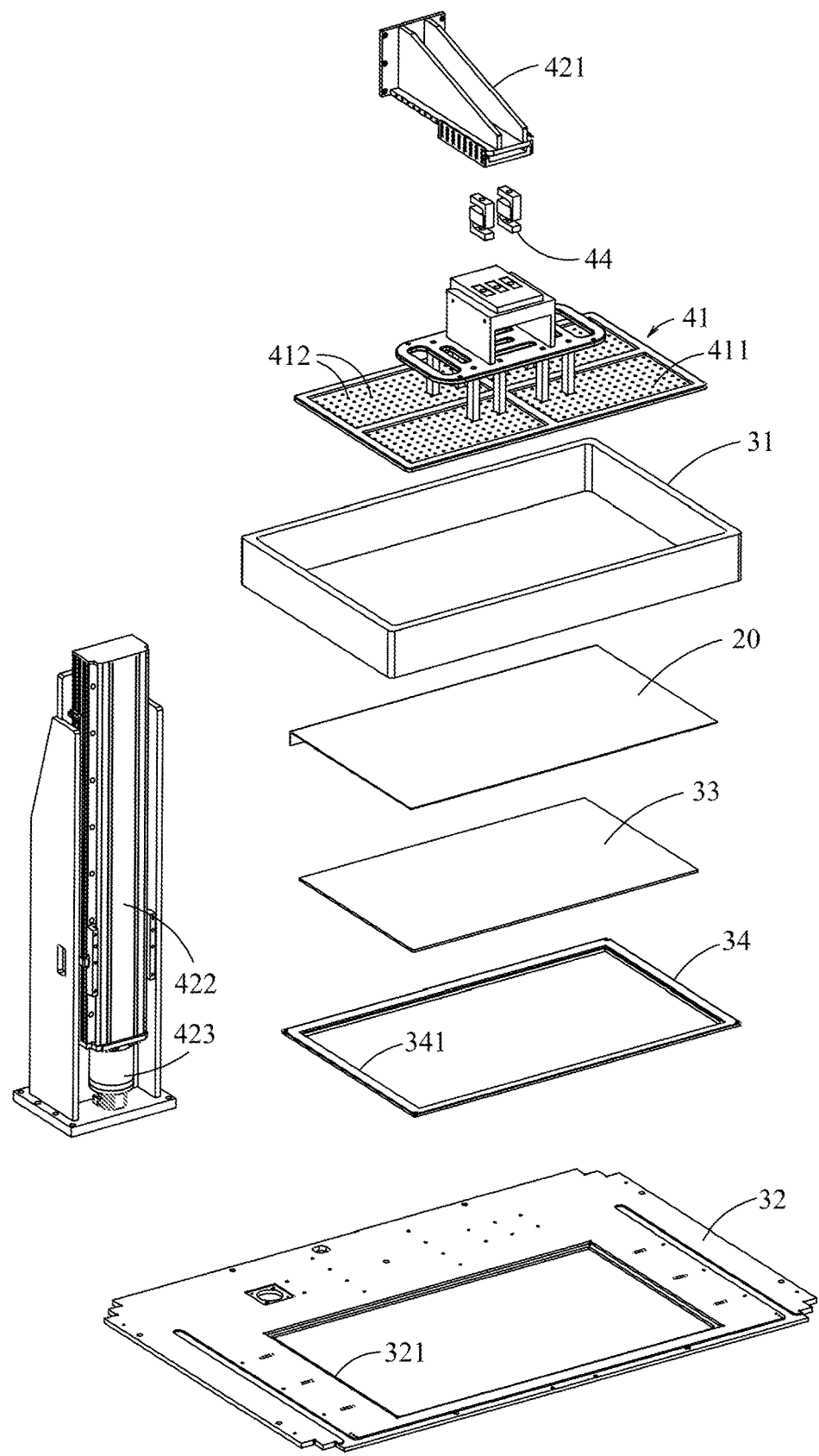
FIG. 3 is an exploded view of the large area deposition type additive manufacturing equipment of FIG. 1.

Referring to FIGS. 1, 2 and 3, an embodiment of a large area deposition type additive manufacturing equipment is disclosed. The large area deposition type additive manufacturing equipment of the present invention is a bottom-up type system and includes a light source module 10, a dynamic photomask module 20, a raw material tank 30 and a deposition module 40. Liquid photocurable material is stored in the raw material tank 30. The deposition module 40 moves downwards into the raw material tank 30. The light source module 10 is disposed under the raw material tank 30 and configured to emit light. The light passes through the dynamic photomask module 20 and reaches the liquid photocurable material in the raw material tank 30. A layer of liquid photocurable material is cured by the light in a specific position and attached to the deposition module 40. Afterwards, the deposition module 40 move upwards, and the liquid photocurable material flows back to fill a space originally occupied by the layer of cured product. The light source module 10 emits light again to cure the liquid photocurable material at the same position so as to form the next layer of the product.

The light source module 10 includes a plurality of light emitting members 11, a light diffusion member 12, a light enhancement member 13 and a light emitting angle limiter 14. The light emitting members 11 are arranged in an array. The light diffusion member 12 includes a plurality of first micro-structures configured to diffuse light. The light enhancement member 13 includes a plurality of second micro-structures configured to converge light. The light emitting angle limiter 14 includes a plurality of third micro-structures configured to limit a light emitting angle at which the light emits from the light source module 10. The light passes through the light diffusion member 12, the light enhancement member 13 and the light emitting angle limiter 14 sequentially to become a curing light having a light emitting angle. The curing light passes through a transparent member 33 disposed on a bottom of the raw material tank 30 and the dynamic photomask module 20 to reach the liquid photocurable material in the raw material tank 30. The liquid photocurable material is cured by the light and deposited on a carrying platform 41 of the deposition module 40.

The light emitting member 11 of the present embodiment is a light emitting diode. A plurality of light emitting diodes are disposed on a circuit board and arranged in an array. The light emitting diodes of the present embodiment are arranged in an array of 6×9, and current-limiting resistances are connected to the light emitting diodes to promote uniformity of illuminance. The light emitting diodes of the present embodiment emit a light having wavelength of 460 nm to 470 nm, visible blue light. As no UV light source is used, the cost of equipment is reduced, and the service life of light emitting diodes and the members constituting the optical path of the light, such as the dynamic photomask module 20, is increased. The persons operating the equipment are also protected to prevent injury caused by the UV light possibly happened in the conventional equipment. Moreover, the light emitting members 11 are divided into multiple groups, and each group is disposed in a control region. A control module 50 described in the following paragraphs controls the light emitting members 11 to emit light in certain specific control regions or in all control regions. The light emitting members 11 corresponding to the part of the liquid photocurable material not intended to be cured are controlled to give off no light. In this way, the service life of the light emitting members 11 is increased, and undesired material curing or residues generation caused by increased sensitivity of the liquid photocurable material after a long-term operation of the equipment is thus prevented.

The light diffusion member 12 exemplarily has a substrate of polyethylene terephthalate (PET). Irregularly-shaped particles or grains are filled into the substrate to constitute the first micro-structure. Light is diffused by the particles or grains when light enters the substrate, whereby the light from the point lint sources, the light emitting diodes, is diffused by the light diffusion member 12 to become light as emitted from a planar light source.

The light enhancement member 13 has a plurality of second micro-structures of prism shape. The light diffused by the light diffusing member 12 enters the light enhancement member 13. The diffused light is refracted by the second micro-structures and thus converged, whereby the light intensity in the front direction (facing the raw material tank 30 is increased.

The light emitting angle limiter 14 has a plurality of third micro-structures of microlouver-shape. The third micro-structures have black color (colored by black dye), which absorbs light. The part of the converged light leaks in large angle is blocked and absorbed by the third micro-structures when the large angle leakage light enters the light emitting angle limiter 14. The light emitting angle limiter 14 of the present embodiment limits the light emitting from the light source module 10 at an angle ranging within ±30° with respect to a central line (the normal line of an incident plane of the light emitting angle limiter 14). Although total light quantity is reduced by the light emitting angle limiter 14 due to the absorption, the disorderly traveling light having a large emitting angle is eliminated, which may cause the liquid photocurable material cured in undesired positions, which become defects of a product.

The dynamic photomask module 20 is disposed above the light source module 10 and generates a plurality of photomask patterns. The dynamic photomask module 20 of the present embodiment is a liquid crystal panel which maintains a high resolution (for example 7680×4320) for a large area deposition. The photomask patterns correspond to the desired curing position of each layer. The liquid crystal molecules allow the light to pass or not, whereby the light cures the liquid photocurable material in the desired positions.

The raw material tank 30 includes a peripheral wall 31, a bottom wall 32 and a transparent member 33. The peripheral wall 31 is detachably connected to the bottom wall 32, and the transparent member 33 is mounted to the bottom wall 32. The liquid photocurable material is stored in the raw material tank 30. The bottom wall 32 is a part of a base which has a length and a width greater than that of the peripheral wall 31. The peripheral wall 31 has a height 15 to 25 times as large as a thickness of the carrying platform 41. The height of the peripheral wall 31 is also greater than that of the conventional raw material tank to avoid the liquid photocurable material sprinkling out of the raw material tank 30.

Figure 4:
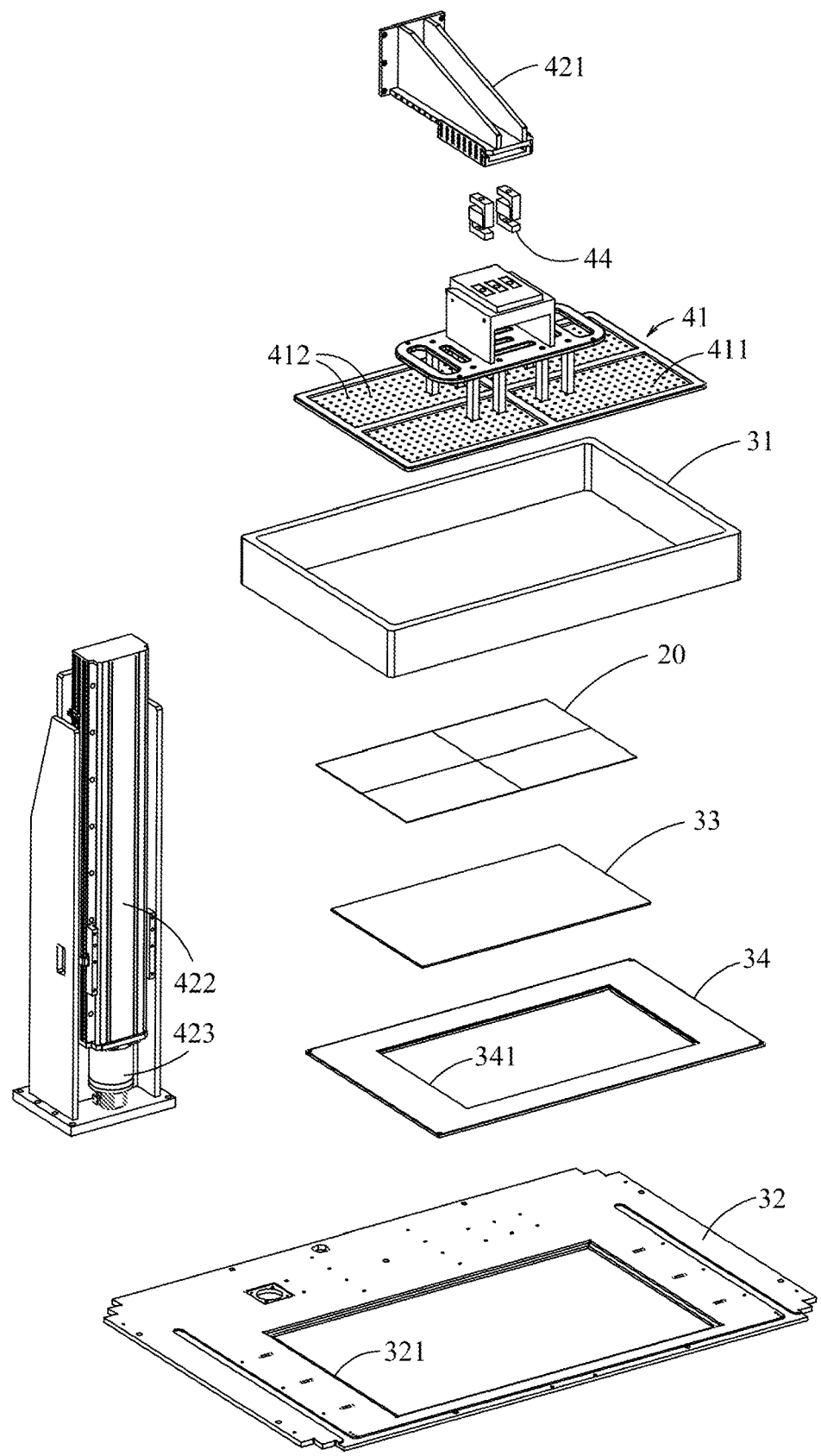
FIG. 4 is an exploded view of another embodiment of a raw material tank of the large area deposition type additive manufacturing equipment of the present invention.

The bottom wall 32 has a first opening 321 on which the transparent member 33 is disposed. The dynamic photomask module 20 corresponds to the first opening 321. The transparent member 33 of the present embodiment is a transparent glass plate. Light from the light source module 10 can pass through the transparent member 33 and enter the raw material tank 30. The raw material tank 30 further includes a quick-detach plate 34 engaging the first opening 321. The quick-detach plate 34 has a second opening 341 on which the transparent member 33 is mounted. The dynamic photomask module 20 is disposed above the light source module 10 and also mounted to the second opening 341. The dynamic photomask module 20 is disposed in the raw material tank 30 and surrounded by the peripheral wall 31. Light from the light source module 10 passes through the transparent member 33 and the dynamic photomask module 20 sequentially. As the dynamic photomask module 20 is mounted to the quick-detach plate 34, and the quick-detach plate 34 is mounted to the first opening 321 of the bottom wall 32. As shown in FIG. 4, the dynamic photomask module 20 can replace liquid crystal panels of different sizes based on requirements, or consist of multiple small liquid crystal panels combined to provide a complete photomask pattern. The quick-detach plate 34 of different sizes can also be used for adapting to the dynamic photomask module 20 of different sizes.

The deposition module 40 includes a carrying platform 41 and a driving device 42. The driving device driving 42 drives the carrying platform 41 to move along a first direction to approach or depart from the bottom wall 32. The carrying platform 41 has a deposition surface 411 opposite to the bottom wall 32. The driving device 42 includes a bracket 421, a rail 422 and a driving member 423. The rail 422 is disposed on the bottom wall 32 and located outside the peripheral wall 31. The rail 422 extends along the first direction Z. The carrying platform 41 is disposed on the bracket 421 movably disposed on the rail 422. The driving member 423 drives the bracket 421 to move forwards and backwards on the rail 422 along the first direction Z. The driving member 423 includes exemplarily a servo motor and a screw rod on which the bracket 421 is screwed. The bracket 421 is moved along the first direction Z through the rotation of the screw rod.

The carrying platform 41 has a larger size, such as a length larger than 32 inches. Therefore, multiple identical or different products can be deposited on the carrying platform 41 in one additive manufacturing process. The carrying platform 41 has a plurality of through holes 412 allowing the liquid photocurable material to flow through and fill the space originally occupied by the cured material, thereby completely covering the cured layer of the product and waiting for formation of the next layer.

The deposition module 40 further includes a plurality of ultrasonic oscillators 43 disposed on a surface of the carrying platform 41 opposite to the deposition surface 411. The ultrasonic oscillators 43 are arranged in an array. When one layer of the liquid photocurable material is cured between the carrying platform 41 and the bottom of the raw material tank 30 (the dynamic photomask module 20 and a liner film on the dynamic photomask module 20), and a portion of the cured material is attached to the bottom of the raw material tank 30, the ultrasonic oscillators 43 are activated to provide vibration which is transmitted to the cured material, thereby separating the cured material from the bottom of the raw material tank 30 (the liner film on the dynamic photomask module 20). Afterwards, the carrying platform 41 moves upwards, and the liquid photocurable material flows back through the through holes 412 to fill the space originally occupied by the cured material. The ultrasonic oscillators 43 of the present embodiment are arranged on the entire carrying platform 41. For the purpose of clear presentation of the carrying platform 41, FIG. 1 shows only the ultrasonic oscillators 43 disposed on a half portion of the carrying platform 41. The ultrasonic oscillators 43 can also be mounted to the peripheral wall 31 or the bottom wall 32 to speed the flow of the liquid photocurable material.

The deposition module 40 further includes a weight sensor 44 disposed at a connection of the carrying platform 41 and the driving device 42 to detect a load of the carrying platform 41. The weight sensor 44 is exemplarily a stress/strain gauge. Speed and displacement of the carrying platform 41 driven by the driving device 42 is determined according to the load of the carrying platform 41 detected by the weight sensor 44. The separation of the product from the carrying platform 41 due to higher moving speed and induced larger drag force is thus prevented.

Figure 5:
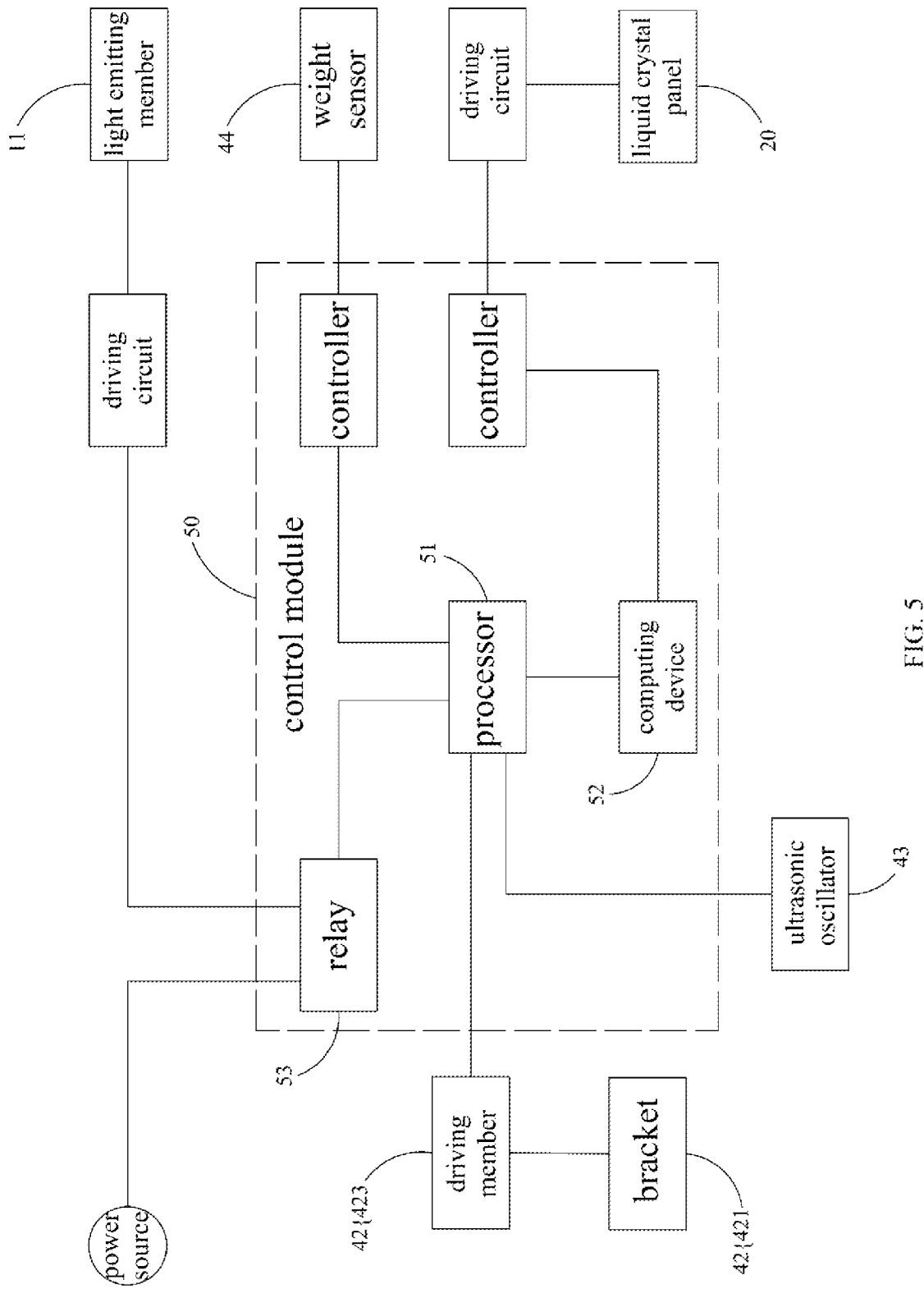
FIG. 5 is a block diagram of the large area deposition type additive manufacturing equipment of FIG. 1.

Referring to FIG. 5, the large area deposition type additive manufacturing equipment of the present embodiment further includes a control module 50 configured to control the speed of the carrying platform 41 based on the load of the carrying platform 41 detected by the weight sensor 44. The control module 50 includes a processor 51 which can be microprocessor chip. The processor 51 is also connected to a computing device 52. The processor 51 transmits control commands to the computing device 52, and the computing device 52 transmits photomask patterns to the liquid crystal display panel of the dynamic photomask module 20. The processor 51 is also connected to a relay 53 controlling the circuits of the light source module 10. The relay 53 enables the circuits of the light source module 10 opened or closed so that the light emitting members 11 emit light or not. The processor 51 can also control the light emitting members 11 in specific regions or in all control regions to emit light. The processor 51 is also connected to the driving member 423 of the driving device 42 to control the rotational speed of the servo motor so as to control the moving speed of the carrying platform 41.

The large area deposition type additive manufacturing equipment of the present invention is provided with the carrying platform of large area, the large bracket, the large rail and the driving member of large power, whereby the additive manufacturing equipment of bottom-up type is able to form a plurality of products on the carrying platform in one process. The ultrasonic oscillator vibrates the product, thereby separating from the bottom of the raw material tank. The weight sensor detects a load of the carrying platform to regulate the speed of the carrying platform so as to reduce the drag force generated between the product and the raw material tank, thereby preventing the product separated from the carrying platform. In the present invention, the carrying platform does not need to move up and down for separation of the product from the raw material tank before the formation of the next layer as what is performed in the conventional additive manufacturing equipment. Therefore, the production rate is increased and the production ability is higher.

Moreover, the large area deposition type additive manufacturing equipment of the present invention is also provided with light source of visible light, and the liquid photocurable material is cured by the visible light. As the UV light is replaced by the visible light, the cost of the equipment is reduced, and the problem of reduction in service life of the equipment caused by UV light is also solved.

Figure 6:
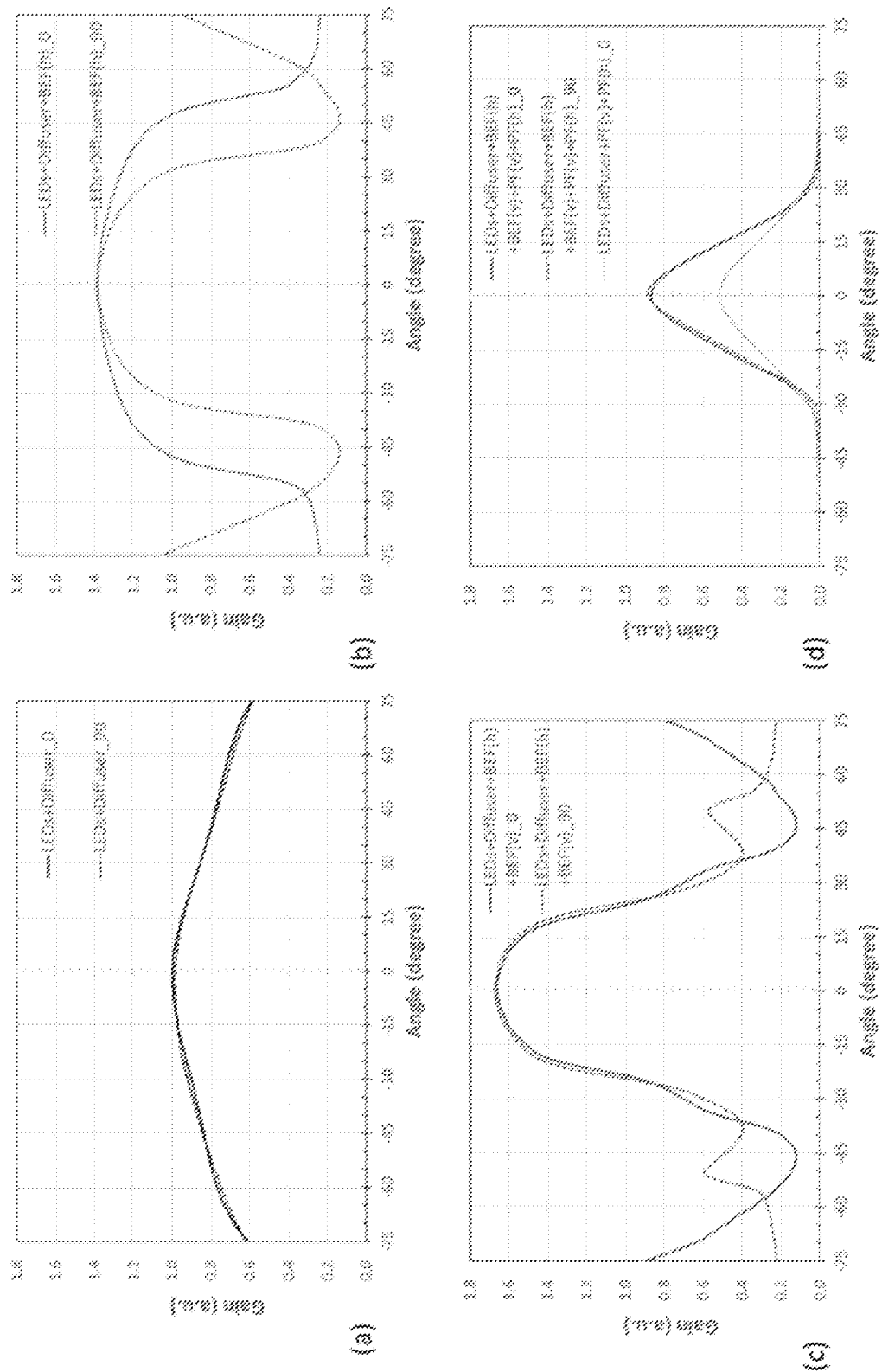
FIG. 6 depicts light emitting angle distribution of the light source module of the large area deposition type additive manufacturing equipment of FIG. 1.

Referring to FIG. 6, the light from the light source module 10 is diffused by the light diffusion member 12 to obtain uniform light as emitting from a planar light source (see (a) of FIG. 6). Two light enhancement members 13 converge the diffused light, and the light intensity at an angle near the normal line is increased through certain light collecting mechanisms (see (b) and (c) of FIG. 6). The light emitting angle limiter 14 eliminates the light traveling at a large incident angle in two lateral sides (see (d) of FIG. 6). Therefore, light from the light source 10 has a uniform light intensity and a small light emitting angle, thereby obtaining photocured products of uniform quality.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A deposition additive manufacturing equipment, comprising:
   a light source module comprising:
      a plurality of light emitting members arranged in an array that can be switched individually;
      a light diffusion member comprising a plurality of first micro-structures configured to diffuse light;
      two light enhancement members which are disposed on the upper surface of the light diffusion member and each of the light enhancement members comprises a plurality of second micro-structures configured to converge the light;
      a light emitting angle limiter which is disposed on the upper surface of the two light enhancement members and comprises a plurality of third micro-structures configured to limit a light emitting angle of the light;
   a dynamic photomask module disposed above the light source module and generating a plurality of photomasks over time;
   a raw material tank comprising a peripheral wall, a bottom wall and a transparent member, wherein the peripheral wall is connected to the bottom wall, and the transparent member is disposed on the bottom wall, and a liquid photocurable raw material is stored in the raw material tank; and
   a deposition module comprising a carrying platform and a driving device driving the carrying platform along a first direction to approach or move away from the bottom wall, wherein the carrying platform has a deposition surface facing the bottom wall;
   wherein the light emitting members emit light to pass through the light diffusion member, the two light enhancement members and the light emitting angle limiter sequentially to form a curing light having a light emitting angle, the curing light travels through the transparent member and reaches the liquid photocurable raw material, the liquid photocurable raw material is cured and deposited to the carrying platform layer by layer, and the light emitting angle ranges within ±30° with respect to a normal line of an incident plane of the light emitting angle limiter; and the first micro-structures are granular.

2. The deposition additive manufacturing equipment as claimed in claim 1, wherein the second micro-structures are pyramid-shaped, and the third micro-structures are louver-shaped.

3. The deposition additive manufacturing equipment as claimed in claim 1, wherein the peripheral wall is detachably connected to the bottom wall, the bottom wall has a first opening to which the transparent member is disposed, and the dynamic photomask module corresponds the first opening.

4. The deposition additive manufacturing equipment as claimed in claim 3, wherein the dynamic photomask module is surrounded by the peripheral wall and disposed near the first opening, and the curing light passes through the transparent member and the dynamic photomask module sequentially.

5. The deposition additive manufacturing equipment as claimed in claim 1, wherein the carrying platform has a plurality of through holes through which the liquid photocurable raw material flows.

6. The deposition additive manufacturing equipment as claimed in claim 1, wherein the deposition module further comprises an ultrasonic oscillator disposed on a surface of the carrying platform opposite to the deposition surface.

7. The deposition additive manufacturing equipment as claimed in claim 1, wherein the deposition module further comprises a weight sensor disposed at the connection of the driving device and the carrying platform, and the weight sensor is configured to detect a load of the carrying platform.

8. The deposition additive manufacturing equipment as claimed in claim 7, wherein the driving device comprises a bracket, a rail and a driving member, the carrying platform is disposed on the bracket, the driving member drives the bracket to move on the rail along the first direction.

9. The deposition additive manufacturing equipment as claimed in claim 7, further comprising a control module configured to control a speed of the carrying platform according to the detection of the weight sensor.

10. The deposition additive manufacturing equipment as claimed in claim 1, wherein the light emitted from the light emitting members is visible light, and the liquid photocurable raw material is cured by visible light.

* * * * *